Dec. 1, 1964   R. E. HUDSON   3,159,343
ANALOG COMPUTER

Filed Jan. 22, 1962   2 Sheets-Sheet 1

INVENTOR.
RAY E. HUDSON
BY
ATTORNEY

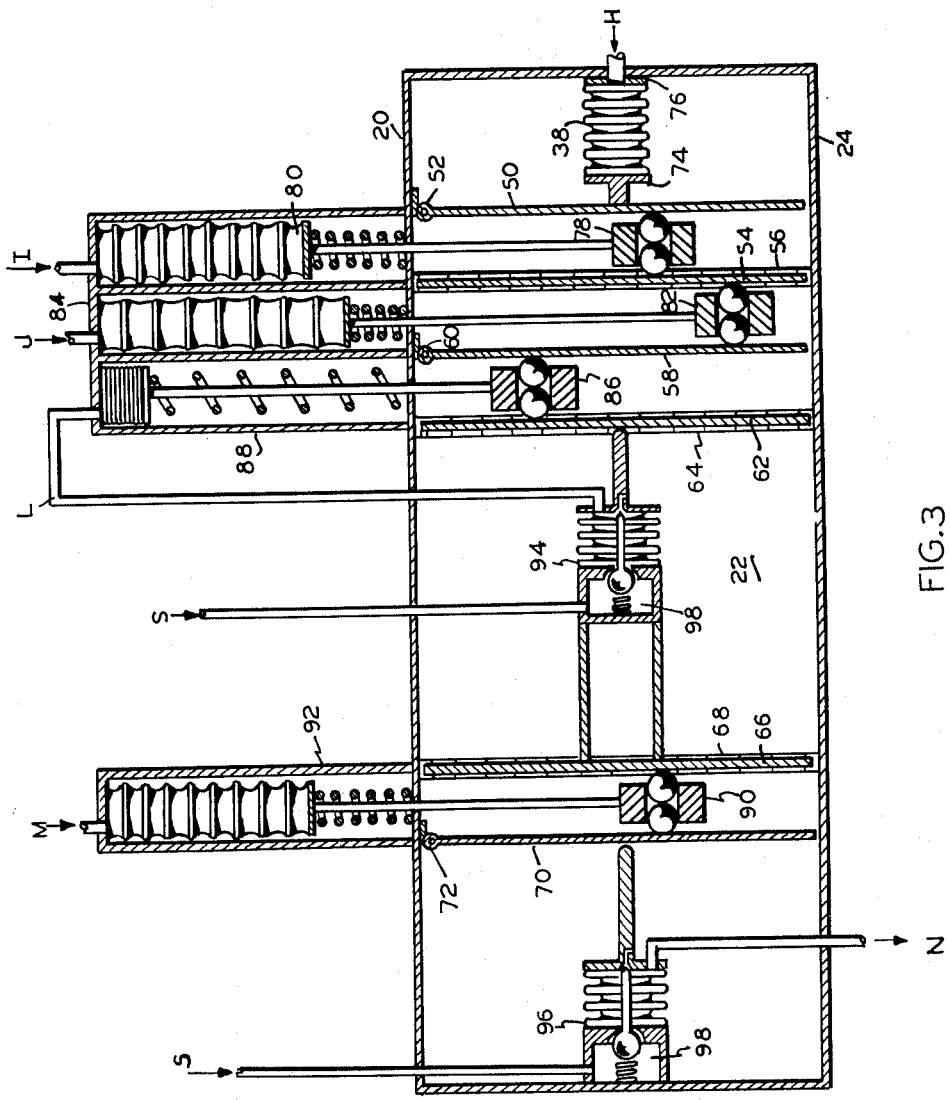

3,159,343
ANALOG COMPUTER
Ray E. Hudson, Odessa, Tex., assignor to The Bell Corporation, Odessa, Tex., a corporation of Texas
Filed Jan. 22, 1962, Ser. No. 167,618
1 Claim. (Cl. 235—200)

This invention pertains to analog computers.

A computer according to this invention is specifically adapted for solving problems involving the multiplication, division, squaring and taking the square root of a plurality of terms.

The mechanism used to achieve this includes several parallel plates. At least half of the plates are hinged or pivoted to rotate about one edge. If a force is applied a known distance from the hinge it will result in a certain moment on the plate. If a force-transmitting element is positioned a varying distance from the hinge it will transmit a second force to the plate next in line which is related to the first force and the distance the transmitted element is positioned from the hinge. If the second plate is mounted for pure translational movement, a resisting force against the second plate will likewise be related to the above mentioned force and distance.

Of course the resisting force itself may be another force transmitting element which bears against the next succeeding plate which may be hinged itself. The force transmitting element is positioned a varying distance from the hinge to add a third factor in the resultant answer.

I have found that one desirable embodiment is to stack the plates with the hinges alternating at right angles to each other. Therefore, the force transmitting element may be positioned a varying distance from the hinge of one plate while remaining a constant distance from the hinge of the adjacent plate.

An object of this invention is to provide an analog computer which will be generally adapted to multiply, divide, square, extract the square root, cube, and extract the cube root of a plurality of terms.

Another object of this invention is to provide such a device which is of general utility and readily adaptable to solve diverse problems.

Another object of this invention is to provide a computer unit which may be added to other computer units so that a special computer may be fabricated to meet any of several particular needs.

A further object is to provide such a unit which has a high degree of accuracy and which is adapted to mass production with low tolerances.

Still further objects are to achieve the above with a device that is sturdy, compact, durable, simple, and reliable, yet inexpensive and easy to manufacture.

The specific nature of the invention as well as other objects, uses and advantages thereof will clearly appear from the following description and from the accompanying drawings, the different views of which are not necessarily to the same scale, in which:

FIG. 3 is a cross-sectional view of another computer according to this invention.

Figure 1:
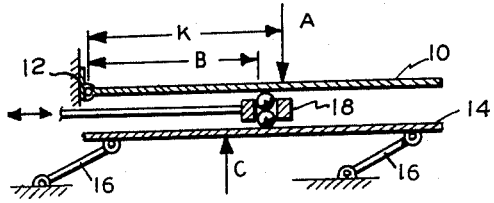
FIG. 1 is a schematic representation of one unit of the computer.

FIG. 1 shows a schematic representation of this invention. Plate 10 is pivoted by hinge 12 to a fixed support. A second plate 14 is mounted by parallel bars 16 so that the plate is maintained at all times in a horizontal position as shown. However, it is free to move vertically. Force A is exerted downward on plate 10 at a fixed distance $k$ from the hinge 12. Force C is exerted upward against the bottom plate 14. Force transmitting element 18 is positioned between the plates 10 and 14. The force transmitting element 18 is positioned ta some varying distance B from the hinge 12. The force transmitting element 18 is in the form of a pair of rolling balls so that in effect the force is transmitted in the center of the balls so that it may be at a definite point from the hinge 12. Inasmuch as the plate 14 is limited at all times to a horizontal position by the parallel bars 16, the force transmitted through the force transmitting element will be force C.

Taking moments around hinge 12 it will be seen that $$Ak = BC \qquad (1)$$

Mathematically solving for A will be seen that $$A = \left(\frac{1}{k}\right)BC \qquad (2)$$

This means that if C is some force related to one value and B is some distance related to another value, that the force A will be related to the product of these two values. Since pneumatic or mechanical devices are available to position B and to exert force C and to determine A, it may be seen that a simple unit has been made by which the product of these two values is obtained.

Solving Equation 1 for C it will be seen that $$C = k\frac{A}{B} \qquad (3)$$

Therfore if A and B are inputs, C may be made the output to determine the value of this division.

Likewise if B is made equal to C, by methods which will be discussed below, it will be seen that the Equation 2 becomes $$A = \left(\frac{1}{k}\right)C^2 \qquad (4)$$

thus obtaining the value squared. Or that Equation 3 becomes $$C = \sqrt{kA} \qquad (5)$$

In the above analysis, it will be noted that it is necessary that the force transmitted by the force transmitting element to be equal to C, or related to C by constant factor. To make this so, the plate 14 must have no movement about an axis which would be intercepted by the path of the force transmitting element as it were moved back and forth at B. However, it may be also seen that if plate 14 were pivoted to a fixed support along an axis which was parallel to the path of movement of the force transmitting element 18 that the force transmitted by the force transmitting element 18 would always bear a constant relationship to the force C provided that C were positioned in a fixed position on the plate 14.

Figure 2:
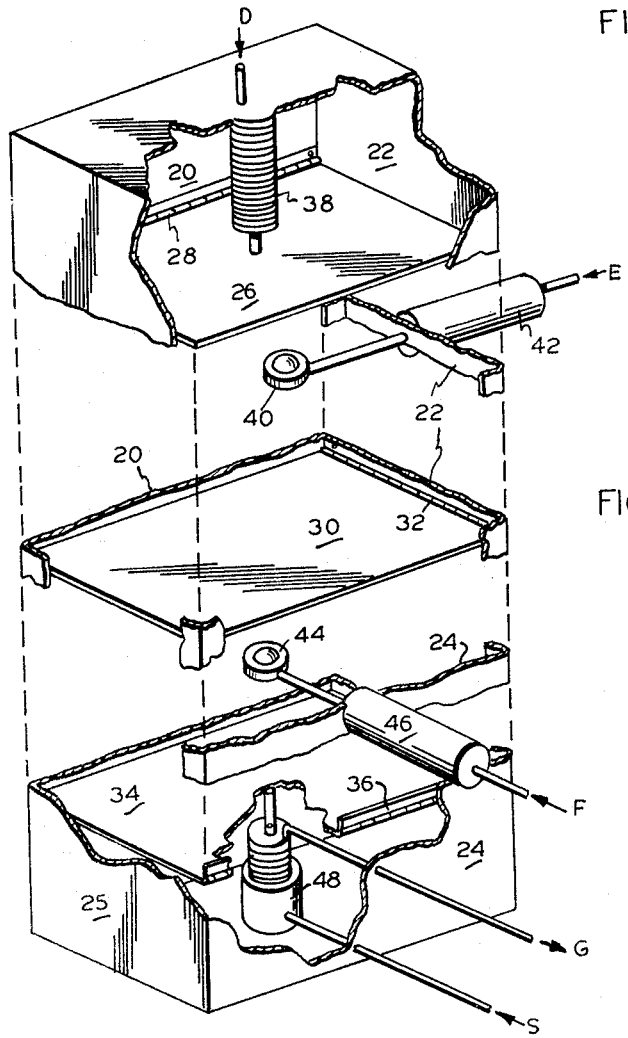
FIG. 2 is an exploded perspective view of a computer according to this invention.

This provides the one method of combining a plurality of these units together to form a computer which solves a problem involving plurality of terms. For example, referring more specifically to FIG. 2, there is a frame with four sides, 20, 22, 24, and 25. Plate 26 is pivoted by hinges 28 to side 20. Plate 30 is pivoted by hinge 32 to side 22. Since the sides are at right angles, the hinge 28 is at right angles to the hinge 32. The plate 34 is pivoted about hinge 36 to side 24 so that hinge 36 is at right angles to the hinge 32. A device 38 is attached to the frame to exert a force which is directly proportional to input signal D. Force transmitting element 40 is positioned a distance from hinge 32 by positioning device 42. The positioning device 42 is such that it causes the relationship of the distance of force transmitting element 40 from this hinge 32 to be directly proportional to input signal E. Also, the force transmitting element 40 is a constant distance from the axis of hinge 28, because it is free to transmit the forces between plates 26 and 30. Likewise a force transmitting element 44 is positioned a distance from hinge 36 which is proportional to input signal F of positioning device 46. Likewise force transmitting element 44 is maintained a fixed distance from hinge 32. The force at the center of the plate 34 is detected by sensing element 48 which is supplied with constant value input S. This sensing element is such as to determine force at this point and to oppose this with equal force, thus maintaining the plates in equilibrium. It is necessary to maintain the plates parallel or nearly so. The force on the sensing element is determined and results in output G. Analysis of the unit involving plates 26 and 30 will show that the force on force transmitting element 44 is equal to KDE where K is some constant. Also, it will be seen by analysing the bottom cell that the output follows the following equation:

$$G = KDEF \qquad (6)$$

It is believed that the versitility of the device may be readily seen because of the simplicity with which the positioning device 46 might be disconnected from side 24 and connected to side 22. Then a resulting equation would be $$G = K\frac{DE}{F} \qquad (7)$$

If with the positioning device 46 connected to side 22 the signal F is connected to the output G so that the signal F is in effect the signal G it will be seen that the equation becomes $$G^2 = KDE$$

or $$G = \sqrt{KDE} \qquad (8)$$

Although I have described the force transmitting element as being positioned by a single positioning device in each instance, it may be seen that the same force transmission device can be positioned by two positioning devices; for example with a Scotch yoke. Therefore, one positioning device could move it parallel to the hinge of the plate above and normal to the hinge of the plate below whereas the other positioning device would move it normal to the hinge above the parallel to the hinge below.

The cross-sectional representation of FIG. 3 illustrates what may be accomplished by using a plurality of plates with a plurality of positioning devices. Plate 50 is pivoted by hinge 52 to side 20. Plate 54 is pivoted by hinge 56 to side 22. Plate 58 is pivoted by hinge 60 to side 20, the same as hinge 52. The plates 62 and 66 are hinged to side 22 (the same as plate 54) by hinges 64 and 68 respectively while plate 70 is hinged about the side 20 by hinge 72 (the same as hinge 52). The force input device 38 is a simple bellows element with left element 74 placed against the plate 50 at some fixed point. Right element 76 is rigidly attached to the frame. The bellows has an outlet tube by which an air pressure signal H is transmitted to the bellows. Force transmitting elements 78, 82, 86, and 90 are positioned a distance from hinges 52, 56, 60, and 72 respectively by positioning devices 80, 84, 88, and 92, respectively. Each of these positioning devices include a long stroke bellows opposed by a spring so that the distance of the force transmitting element to its respective hinge is proportioned respective to the signals I, J, L, and M.

Sensing elements 94 and 96 are conventional and will be defined only briefly. The left chamber 98 is adapted to receive air of constant pressure of some supply S. A valve between chamber 98 and the bellows normally prohibits the air from entering within the bellows. The valve extends through the bellows, the right end of the valve rests against the end of the bellows. The end of the bellows has a valve seat which is vented to atmosphere. The pressure within the bellows is the output pressure. Such sensing elements are well known to the art and are not further discussed here.

The left end of the sensing element 96 is attached to the frame while the right end sensing element 96 bears against the plate 70. The left end of sensing element 94 is attached to plate 66, the right end bears against the plate 62. The pressure within the bellows of element 96 is the output pressure N. The pressure within the bellows of element 94 is the signal L which is the input of positioning device 88. It will be seen by analysis that $$L = K\sqrt{\frac{HJ}{I}} \qquad (9)$$

Or that the output signal $$N = K_2 M \sqrt{\frac{HJ}{I}} \qquad (10)$$

where K and $K_2$ are some constants.

It will be understood that the sensing element 48 might be similar to the sensing elements 94 and 96 or other type sensing elements, might be used such as pneumatic, mechanical, or electrical. Likewise, the positioning devices 46, 42, could be of different natures as could the positioning devices 80, 84, 88, and 92.

It will be apparent that the embodiments shown are only exemplarly and that various modifications can be made in construction, materials, and arrangement within the scope of the invention as defined in the appended claim.

I claim as my invention:

An analog computer comprising:
(a) a frame
(b) at least three parallel plates,
(c) all said plate pivoted to said frame,
(d) a force transmitting element within each space between each pair of plates,
(e) the axis about which each plate is pivoted being at an angle to the axis about which at least one adjacent plate is pivoted,
(f) at least one plate hinged about an axis coincident with one edge to the frame,
(g) means for moving at least one element toward and away from said coincident axis,
(h) means for moving at least one element parallel to the said coincident axis,
(i) means for extering a varying input force against one end plate, and.
(j) means for determining and exterting a force necessary to maintain the plates in static position against the other end plate.

References Cited by the Examiner

UNITED STATES PATENTS

| | | | |
|---|---|---|---|
| 2,481,648 | 9/49 | Dehn | 235—61 |
| 2,487,310 | 11/49 | Chandler | 235—61 X |
| 3,072,326 | 1/63 | Rohmann | 235—61 |

FOREIGN PATENTS 536,537  5/41  Great Britain.

ROBERT L. EVANS, *Primary Examiner.*

LEO SMILOW, *Examiner.*